United States Patent [19]
Collins

[11] 3,981,045
[45] Sept. 21, 1976

[54] STUNNING AND OVERLOAD CIRCUIT
[75] Inventor: John Collins, Kansas City, Mo.
[73] Assignee: Jerry L. McWhirter, St. Joseph, Mo.
[22] Filed: Mar. 19, 1975
[21] Appl. No.: 559,899

[52] U.S. Cl. .................................. 17/1 E; 17/11
[51] Int. Cl.² .......................................... A22B 3/08
[58] Field of Search ............. 17/11, 1 E; 128/419 R, 128/1 C, 421

[56] References Cited
UNITED STATES PATENTS

| | | | |
|---|---|---|---|
| 3,110,925 | 11/1963 | McMath et al. ....................... | 17/1 E |
| 3,123,852 | 3/1964 | Cervin ................................... | 17/1 E |
| 3,857,138 | 12/1974 | McWhirter ............................ | 17/11 |

FOREIGN PATENTS OR APPLICATIONS

| | | | |
|---|---|---|---|
| 148,150 | 5/1961 | U.S.S.R. ............................... | 128/1 C |

Primary Examiner—Hugh R. Chamblee
Attorney, Agent, or Firm—Fishburn, Gold & Litman

[57] ABSTRACT

A stunning and overload protection circuit for animal stunning apparatus is operative to relax the respective animal, such as poultry, yet not damage same and includes power supply means operative to provide pulsating direct current to a timing circuit which effects activating and deactivating of one electrode of the animal stunning apparatus, and an overload protection circuit electrically connected to the power supply means and to the timing circuit and operative to prevent activating of the electrode and to provide an alternate path for power supply current in the event of application of a load above a selected amount to the electrodes of the stunning apparatus.

15 Claims, 2 Drawing Figures

STUNNING AND OVERLOAD CIRCUIT

The present invention relates to animal stunning apparatus and more particularly to a stunning and overload circuit operative to relax the respective animals and having components providing overload protection for a timing circuit in the event of application of load above a selected amount to electrodes of the stunning apparatus.

The circuit is particularly useful in stunning apparatus such as disclosed in U.S. Pat. No. 3,857,138 issued Dec. 31, 1974 to Garland G. McWhirter for Electronic Relaxer and Stabilizer and in U.S. patent application of Garland G. McWhirter, Ser. No. 429,867, filed Jan. 2, 1974 for Method and Apparatus for Electronically Relaxing Poultry.

The principal objects of the present invention are: to provide a stunning and overload protection circuit for animal stunning apparatus operative to supply pulsating stunning current to an animal, poultry, fish, or the like, for ease in processing thereof; to provide such a stunning and overload protection circuit wherein the stunning circuit includes a timing circuit having a discharging portion to assure a reference level setting and to maintain uniformity in operation of the timing circuit; to provide such a stunning and overload protection circuit wherein the overload protection circuit includes a bypass circuit portion operative to prevent activating or charging of the timing circuit; to provide such a stunning and overload protection circuit wherein the bypass circuit operates in one cycle of pulsating direct current to prevent damage to components of the timing circuit; to provide such an overload protection circuit having a blocking circuit portion electrically connected to the timing circuit and to the bypass circuit to prevent electrical bypass of the overload protection circuit; to provide such a stunning and overload protection circuit which includes a signal circuit portion electrically connected to the power supply means and to the bypass circuit portion to provide an electrical signal to the bypass circuit portion to activate same; and to provide such a stunning and overload circuit which is economical to manufacture, positive in operation, safe in use, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and includes an exemplary embodiment of the present invention and illustrates various objects and features of the stunning and overload circuit.

Figure 1:
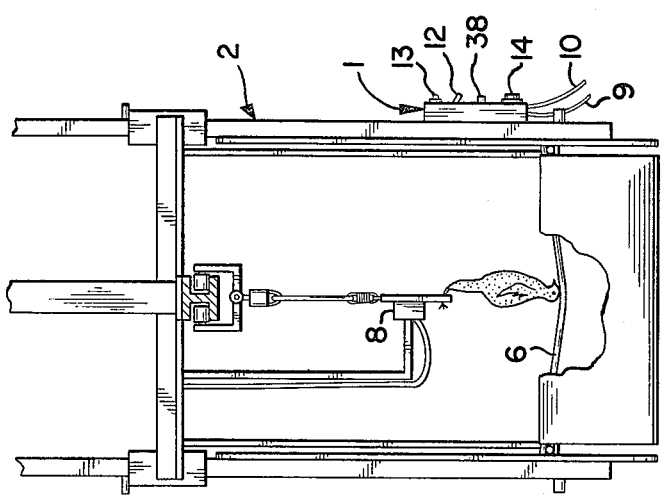
FIG. 1 is an end view of an animal stunning apparatus.
Figure 2:
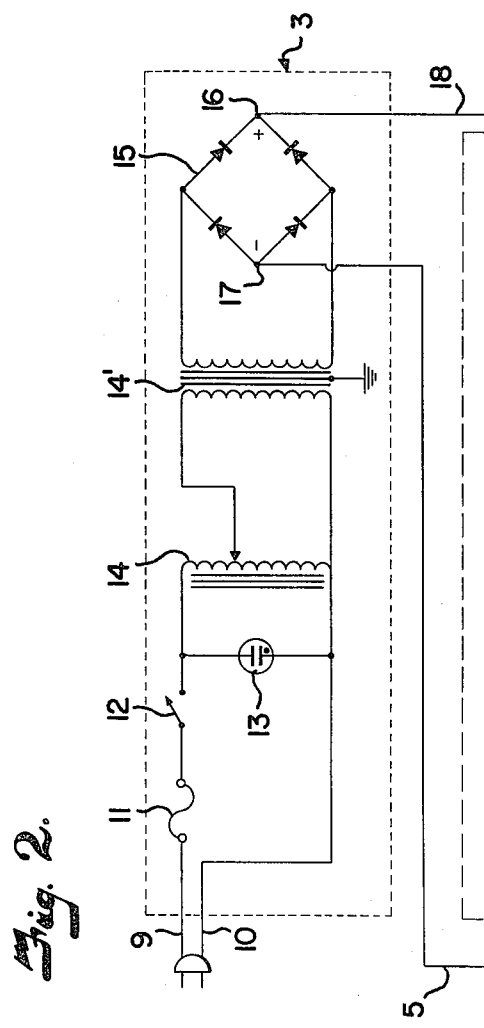
FIG. 2 is a diagram of a stunning and overload circuit for use in animal stunning apparatus and embodying features of the present invention.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawing:

In the disclosed embodiment of the present invention, the reference numeral 1 designates generally a stunning and overload protection circuit for animal stunning apparatus 2. The stunning and overload circuit 1 is operative to relax the respective animal, such as poultry, yet not damage same thereby preparing the animal for processing. The stunning and overload circuit 1 includes power supply means 3 operative to provide pulsating direct current to a timing circuit 4 electrically connected to an electrical conductor 5 which is connected to one electrode 6 of the animal stunning apparatus 2. The timing circuit means 4 effects activating and deactivating of the electrode 6. An overload protection circuit 7 is electrically connected to the power supply means 3 and to the timing circuit 4 and is operative to prevent activating the electrode 6 in the event of application of load above a selected amount to the one electrode 6 and to a second electrode 8 of the stunning apparatus 2. The overload protection circuit 7 provides an alternate path for power supply current in the event of application of an excessive load to the electrodes 6 and 8.

The power supply means 3 includes power conductors 9 and 10 electrically connected to a source of alternating current, such as 110 volts. The power supply means 3 is operative to provide pulsating direct current. A suitable fuse 11 is included, for example in conductor 9, to protect the power supply from possible short circuits in the stunning and overload protection circuit 1. An "on-off" switch 12 is operative to connect the power supply 3 to the source of alternating current. A pilot light 13 is electrically connected across the power conductors 9 and 10 and is operative to indicate electrical flow through the conductors 9 and 10.

The power conductors 9 and 10 are electrically connected to input terminals of a variable transformer voltage control means or variac 14. Variac 14 is adjustable to supply a selected voltage to the primary winding of power transformer 14'. Power transformer 14' is a 1:2 stepup transformer, therefore the voltage at the secondary winding is double the voltage received at the primary. The secondary winding of power transformer 14' is connected to input terminals of a full-wave rectifier 15. The output of the full-wave rectifier 15 is pulsating direct current. A positive output terminal 16 of power supply 3 is connected to the positive electrode 8 of the stunning apparatus 2 by means of a conductor 18, while a negative power supply terminal 17 is connected through components of the timing and overload circuit to the negative stunning electrode 6.

A suitable volt meter 20 is connected across the respective positive and negative electrodes 8 and 6 to assist in adjustment of the variac 14. The stunning apparatus 2 includes the timing circuit means 4 operative to activate and deactivate the electrode 6. The timing circuit includes a resistor 22 and a capacitor 23 whereby a certain time is required for build-up of a selected charge within the capacitor 23 which receives, stores, and then releases the selected charge thereby defining a charging or activating circuit portion of the timing circuit 4.

The timing circuit 4 includes a bi-directional diode thyristor or diac 25 operative to trip or go into a conduction state when the potential across the capacitor 23 as a result of the charge held therein reaches a selected valve thus providing a gate signal current to a reverse triode thyristor or silicon controlled rectifier 26 electrically connected to the electrode 6. The SCR 26 is operative to permit one way electrical flow from the electrode 6 to the negative terminal 17 of the full-wave rectifier 15 of the power supply means 3 thereby defining a conducting circuit portion of the timing circuit 4.

The timing circuit 4 includes a resistor 28 and a rectifier diode 29 arranged in series and operative to discharge the capacitor 23 of the charging or activating circuit portion to a substantially zero potential on each cycle of pulsating direct current to thereby assure a reference level setting and to maintain substantially uniform operation of the timing circuit means 4. The resistor 28 and the diode 29 define a discharging circuit portion of the timing circuit means 4.

The overload circuit means 7 is electrically connected to the power supply means 3 and to the timing circuit 4 for preventing activating or charging of the electrode 6 in the event of application of load above a selected amount up to and including a short circuit to the electrodes 6 and 8 of the stunning apparatus 2. The overload protection circuit 7 provides an alternate path for power supply current in the event of application of an excessive load to the electrodes 6 and 8. A resistor 30 is connected between the anode of SCR 26 and the negative terminal 17 of rectifier 15 of the power supply means 3.

The cathode of a breakdown or zener diode 32 is electrically connected between SCR 26 and resistor 30. When an excessive load is applied at the electrodes 6 and 8 sufficient to effect a relatively high voltage across the resistor 30, a voltage appears across the zener diode 32 which breaks down or goes into a conduction state to thereby trip a silicon controlled rectifier 33.

The overload protection circuit 7 includes a gate signal path having one terminal thereof connected between the SCR 26 and the resistor 30 and including the zener diode 32 and the other terminal connected to the SCR 33.

The overload protection circuit 7 includes an electrical path between terminals 34 and 35 and a rectifier diode 36 is provided in the path. Electrical flow through the zener diode 32 provides a gate signal to or trips the SCR 33 thereby lowering voltage thereacross from approximately 180 volts to approximately 0.5 volts effectively shorting the capacitor 23 by allowing current flow through the diode 36 which prevents charging of the capacitor 23 in the timing circuit 4 and preventing damaging voltage build-up at the diac 25, therefore no gate signal is provided for SCR 26.

The diode 36 has the anode thereof connected to terminal 34 and the cathode thereof connected to terminal 35. The diode 36 is operative to allow current from electrode 6 to be shunted through the SCR 33, but prevents capacitor 23 from being charged by current flowing from the power supply 3 when the overload circuit 7 is not operational.

Additional protection is provided for the diac 25 by a rectifier diode 37 electrically positioned between the diac 25 and the SCR 26 and operative to block current flow through the diac 25 in the event of shorted electrodes 6 and 8.

After the SCR 33 has been tripped, electrical flow is through the alternate path between the terminals 34 and 35 thereby by-passing the capacitor 23 of the timing circuit 4. The diode 36 in the alternate path is operative to electrically block current flowing through same from terminal 35 to terminal 34 and into the charging circuit portion and thereby charging the capacitor 23.

A reset switch 38 has first and second arms 39 and 40 movable to engage contact points 41 and 42 in the timing circuit 4 and the protection circuit 7 respectively. The overload protection circuit 7 includes an electrical path 43 defining a bypass of the SCR 33 when the second arm 40 of the switch 38 engages the contact points 42. The reset switch 38 has the arms 39 and 40 thereof sequenced so the protection or overload circuit 7 is armed before the timing circuit 4 is reenergized. The second arm 40 is adapted to make contact with the contact points 42 only after the arm 39 is open and is separated from the contact points 41. The second arm 40 is adapted to break contact with the contact points 42 prior to engagement of the first arm 39 with the contact points 41 in the timing circuit 4. Contact of switch arm 40 with contact points 42 is operative to short SCR 33, thus tripping it into non-conducting state and ready for protective action as soon as contact between arm 39 and contact points 41 has been reestablished.

A rectifier diode 44 and a capacitor 45 are provided in the overload protection circuit 7 and are operative to define a rectifier and filter to provide pure direct current to bias the silicon controlled rectifier 33, such that SCR 33 does not turn off as the power supply voltage approaches zero on each cycle of pulsating direct current. The diode 44 also prevents capacitor 45 from filtering the pulsating stunning current.

A resistor 46 is electrically connected in an electrical path between the SCR 33 and the diode 44 thereby limiting maximum current through the SCR 33.

Additional protection for the SCR 33 is provided by a resistor 47 operative to limit current to a gate 48 of the SCR 33. A resistor 49 and a capacitor 50 are arranged in parallel and operative to stabilize the overload protection circuit 7 by making the gate 48 of SCR 33 less sensitive to small variations caused by line surges and the like.

Resistor 46 together with resistor 51 form a voltage divider network so that SCR 33 may be a selected rating.

The overload circuit 7 trips out the timing circuit 4 in less than one cycle of the pulsating direct current and thereby protects the solid state devices of the timing circuit 4, namely the diac 25 and the SCR 26 from excessive current caused by an excessive load at the electrodes 6 and 8.

It is to be understood that while I have illustrated and described one form of my invention, it is not to be limited to the specific form or arrangement of parts herein described and shown.

What I claim as new and desire to secure by Letters Patent in the United States is:

1. A stunning and overload protection circuit for animal stunning apparatus having spaced first and second electrodes engageable by an animal and comprising:

a. power supply means for providing pulsating direct current to a first and a second electrode of an animal stunning apparatus;

b. timing circuit means electrically connected to said power supply means for activating and deactivating one electrode of an animal stunning apparatus;

c. overload protection circuit means electrically connected to said power supply means and to said timing circuit means for preventing activating of said one electrode in the event of application of a load drawing a quantity of said current above a selected amount across the electrodes of the stunning apparatus;

d. said timing circuit means comprising:
1. a charging circuit portion including a resistor and a capacitor electrically connected to said power supply means and operative to receive and release an electrical charge of a selected value;
2. a conducting circuit portion including a diac and a silicon controlled rectifier (SCR) having a gate, said diac being electrically connected between said charging circuit portion and the gate of said silicon controlled rectifier, said SCR being electrically connected between said one electrode and said power supply means and operative to block current flow therebetween until a proper gate signal has been applied, said conducting circuit portion being operative to conduct a portion of the electrical charge from said charging circuit portion to supply a gate signal to said SCR to thereby activate said one electrode; and
3. a discharging circuit portion including a resistor and a diode electrically connected to said charging circuit portion and to said conducting circuit portion and operative to discharge said capacitor of said charging circuit portion of substantially all of said charge during each cycle of said pulsating direct current to maintain substantially uniform operation of said timing circuit means.

2. A stunning and overload circuit as set forth in claim 1 wherein said overload protection circuit means comprises:
a. a bypass circuit portion including a zener diode and a silicon controlled rectifier and diode electrically connected to said charging circuit portion and to said conducting circuit portion of said timing circuit means and operative to prevent charging of said capacitor means and thereby bypassing said charging circuit portion;
b. switch contact points in said charging circuit portion of said timing circuit means and in said bypass circuit portion of said overload circuit means; and
c. switch means having first and second arms movable between a first position with said first arm in engagement with said contact points in said charging circuit portion and a second position with said second arm in engagement with said contact points in said overload protection circuit means, said second arm making no contact in said first position and said first arm making no contact in said second position.

3. A stunning and overload circuit as set forth in claim 2 wherein said bypass circuit portion includes a blocking circuit portion comprising a diode electrically connected to said charging circuit portion of said timing circuit means and to said silicon controlled rectifier of said overload protection circuit means and operative to permit one direction current flow from said charging circuit portion to said silicon controlled rectifier of said bypass circuit portion and to prevent current flow in the other direction.

4. A stunning and overload circuit as set forth in claim 2 wherein said overload circuit means includes a biasing circuit portion diode means and capacitor means electrically connected to said power supply means and to said bypass circuit portion of said overload protection circuit means and operative to maintain operation of said silicon controlled rectifier means of said bypass circuit portion.

5. A stunning and overload protection circuit for animal stunning apparatus having spaced first and second electrodes engageable by an animal and comprising:
a. power supply means for providing pulsating direct current to a first and a second electrode of an animal stunning apparatus;
b. timing circuit means electrically connected to said power supply means for activating and deactivating one electrode of an animal stunning apparatus;
c. overload protection circuit means electrically connected to said power supply means and to said timing circuit means for preventing activating of said one electrode in the event of application of load drawing a quantity of said current above a selected amount to the electrodes of the stunning apparatus;
d. said timing circuit including:
1. a silicon controlled rectifier electrically connected between said one electrode and said power supply means, said silicon controlled rectifier having a gate and operative to effect intermittent activation of said one electrode when a proper gate signal is supplied; and
2. means in the circuit for supplying said gate signal.

6. A stunning and overload circuit as set forth in claim 5 wherein said means for supplying said gate signal includes:
a. a charging circuit portion including a resistor and a capacitor electrically connected to said power supply means and operative to receive, store, and release an electrical charge of a selected value;
b. a conducting circuit portion including a selected voltage breakdown device electrically connected to said silicon controlled rectifier gate, said breakdown device being operative to permit conduction of said selected charge from said capacitor to said gate when the voltage across said breakdown device reaches a selected value; and
c. a discharging circuit portion including a resistor and a diode electrically connected to said charging circuit portion and to said conducting circuit portion and operative to discharge said capacitor of substantially all of said charge during each cycle of said pulsating direct current to maintain substantially uniform operation of said timing circuit means.

7. A stunning and overload circuit as set forth in claim 6 wherein said selected voltage breakdown device is a diac.

8. A stunning and overload protection circuit for animal stunning apparatus having spaced first and second electrodes engageable by an animal and comprising:
a. power supply means for providing pulsating direct current to a first and a second electrode of an animal stunning apparatus;
b. timing circuit means electrically connected to said power supply means for activating and deactivating one electrode of an animal stunning apparatus;
c. overload protection circuit means electrically connected to said power supply means and to said timing circuit means for preventing activating of said one electrode in the event of application of load drawing a quantity of said current above a selected amount to the electrodes of the stunning apparatus;

d. said overload protection circuit means including:
1. a bypass circuit portion including zener diode means and silicon controlled rectifier means and diode means electrically connected to said timing circuit means and operative to prevent electrical flow through said timing circuit;
2. switch contact points in said timing circuit means and in said bypass circuit portion of said overload protection circuit means; and
3. switch means having first and second arms movable between a first position with said first arm in engagement with said contact points in said timing circuit means and a second position with said second arm in engagement with said contact points in said bypass circuit portion of said overload protection circuit means.

9. A stunning and overload circuit as set forth in claim 8 wherein said bypass circuit portion includes a blocking circuit portion comprising a diode electrically connected to said timing circuit means and to said silicon controlled rectifier of said overload protection circuit means and operative to permit one direction current flow from said charging circuit portion to said silicon controlled rectifier of said bypass circuit portion and to prevent current flow in the other direction.

10. A stunning and overload circuit as set forth in claim 9 wherein said overload circuit means includes a biasing circuit portion including diode means and capacitor means electrically connected to said power supply means and to said bypass circuit portion of said overload protection circuit means and operative to maintain operation of said silicon controlled rectifier means of said bypass circuit portion.

11. A stunning and overload circuit as set forth in claim 10 wherein said timing circuit means comprises:
a. a charging circuit portion including resistor means and capacitor electrically connected to said power supply means and operative to receive and release an electrical charge of a selected value, said blocking circuit portion being electrically connected to charging circuit portion between said resistor means and said capacitor means;
b. a conducting circuit portion including a diac and a silicon controlled rectifier having a gate, said diac being electrically connected between said changing circuit portion and the gate of said silicon controlled rectifier, said SCR electrically connected between said one electrode and said power supply means and operative to block current flow therebetween until a proper gate signal has been applied, said conducting circuit portion being operative to conduct a portion of the electrical charge from said charging circuit portion to supply a gate signal to said SCR to thereby activate said one electrode, said conducting circuit portion having diode means positioned between said diac and said silicon controlled rectifier and operative to block electrical flow from said silicon controlled rectifier to said diac; and
c. a discharging circuit portion including resistor means and diode means electrically connected to said charging circuit portion and to said conducting circuit portion and operative to discharge said capacitor means of said charging circuit portion to maintain substantially uniform operation of said timing circuit means.

12. A stunning and overload protection circuit for an animal stunning apparatus having spaced first and second electrodes engageable by an animal and comprising:
a. power supply means for providing pulsating direct current to a first and a second electrode of an animal stunning apparatus;
b. timing circuit means electrically connected to said power supply means for activating and deactivating one electrode of an animal stunning apparatus; and
c. circuit overload protection means electrically connected to said power supply means and to said timing circuit means whereby said one electrode is prevented from activating in the event of a circuit damaging quantity of said current being conducted through said one electrode of said stunning apparatus.

13. A stunning and overload circuit as set forth in claim 12 wherein said power supply means includes a source of alternating current and a variable transformer means receiving the alternating current and full-wave rectifier means receiving the adjusted output of said transformer means and operative to convert said alternating current to pulsating direct current.

14. A stunning and overload circuit as set forth in claim 12 wherein:
a. said circuit overload protection means comprises a bypass circuit portion;
b. said bypass circuit portion includes:
1. silicon controlled rectifier means;
2. means for supplying a gate signal to said SCR means in response to a flow of said current through said one electrode in excess of a selected amount; and
3. diode means electrically connected to said timing circuit means and operable to prevent electrical flow through said timing circuit means.

15. A stunning and overload circuit as set forth in claim 14 wherein:
a. said means for supplying said gate signal includes a zener diode.

* * * * *